(12) United States Patent
Haufe et al.

(10) Patent No.: US 9,555,358 B2
(45) Date of Patent: Jan. 31, 2017

(54) INDUSTRIAL COATING APPLICATION FILTER WITH PLEATED SUPPORT

(71) Applicant: Columbus Industries, Inc., Ashville, OH (US)

(72) Inventors: Michael K. Haufe, Upper Arlington, OH (US); Mounir B. H. Slama, Dublin, OH (US); James E. Large, Circleville, OH (US)

(73) Assignee: Columbus Industries, Inc., Ashville, OH (US)

(*) Notice: Subject to any disclaimer, the term of this patent is extended or adjusted under 35 U.S.C. 154(b) by 120 days.

(21) Appl. No.: 14/246,669

(22) Filed: Apr. 7, 2014

(65) Prior Publication Data

US 2014/0298764 A1    Oct. 9, 2014

Related U.S. Application Data

(60) Provisional application No. 61/808,946, filed on Apr. 5, 2013.

(51) Int. Cl.
*B01D 46/10* (2006.01)
*B01D 46/52* (2006.01)
*B01D 46/00* (2006.01)

(52) U.S. Cl.
CPC ........... *B01D 46/10* (2013.01); *B01D 46/0001* (2013.01); *B01D 2265/06* (2013.01); *Y10T 29/49826* (2015.01)

(58) Field of Classification Search
CPC ........... B01D 46/0001; B01D 46/0002; B01D 46/0005; B01D 46/10; B01D 46/125; B01D 46/52
USPC ............... 55/497, 498, 496, 499, 502, 521, DIG. 5,55/DIG. 31, DIG. 46; 264/DIG. 48
See application file for complete search history.

(56) References Cited

U.S. PATENT DOCUMENTS

| | | |
|---|---|---|
| 2,992,701 A | 7/1961 | White |
| 3,075,337 A | 1/1963 | Andreae |
| 4,008,060 A | 2/1977 | Andreae |
| 4,737,174 A | 4/1988 | Pontius |
| 4,894,073 A | 1/1990 | Andreae |

(Continued)

FOREIGN PATENT DOCUMENTS

| | | |
|---|---|---|
| EP | 1492609 | 1/2005 |
| EP | 2532409 | 12/2012 |
| WO | 03084638 | 10/2003 |

*Primary Examiner* — Jacob T Minskey
*Assistant Examiner* — Minh-Chau Pham
(74) *Attorney, Agent, or Firm* — Jason H. Foster; Kremblas & Foster

(57) ABSTRACT

A filter for industrial coating filtration systems. The filter has a housing made up of a peripheral wall extending around the periphery. The housing is preferably made of a suitably rigid material. A preferably rigid support backing is mounted within the housing. The support backing has a planar configuration with openings formed through it so that air can flow through without substantial resistance. The preferably planar sheet of which the support backing is made is pleated. The pleated support backing defines a series of panels, each of which is angled to a next adjacent panel. Filtration media is mounted to the support backing, end caps are attached to the ends of the support backing to maintain the pleated configuration, and the assembly is inserted into the housing, which can have end flaps to seal using tape or adhesive.

10 Claims, 14 Drawing Sheets

(56) References Cited

U.S. PATENT DOCUMENTS

| | | | |
|---|---|---|---|
| 5,051,118 A | 9/1991 | Andreae | |
| 6,001,151 A | 12/1999 | Elshout | |
| 6,328,778 B1 | 12/2001 | Richerson et al. | |
| 6,616,720 B1 | 9/2003 | Smith | |
| 6,790,397 B2 | 9/2004 | Richerson et al. | |
| 6,814,773 B2 * | 11/2004 | Shah | B01D 46/0004 55/496 |
| 7,037,354 B1 * | 5/2006 | Dimicelli | B01D 46/0002 55/497 |
| 7,156,898 B2 * | 1/2007 | Jaisinghani | B03C 3/09 264/257 |
| 7,225,931 B2 | 6/2007 | Glad | |
| 7,309,369 B2 | 12/2007 | Eder | |
| 7,410,520 B2 * | 8/2008 | Nowak | B01D 46/0016 55/482 |
| 7,452,412 B2 | 11/2008 | Cummins | |
| 7,670,397 B2 | 3/2010 | Bauer | |
| 7,931,726 B2 * | 4/2011 | Karlsson | B01D 46/0001 264/DIG. 48 |
| 8,075,658 B2 * | 12/2011 | Volkmer | B01D 46/0005 55/497 |
| 8,157,881 B1 * | 4/2012 | Anoszko | B01D 46/0005 55/481 |
| 8,197,571 B2 * | 6/2012 | Porter | B01D 46/10 55/497 |
| 8,425,644 B2 * | 4/2013 | Sundvik | B01D 46/125 55/484 |
| 8,852,308 B2 * | 10/2014 | Jarrier | B01D 46/002 55/483 |
| 8,940,069 B2 * | 1/2015 | Haider | B01D 46/10 55/481 |
| 2003/0230061 A1 * | 12/2003 | Kubokawa | B01D 46/10 55/486 |

* cited by examiner

INDUSTRIAL COATING APPLICATION FILTER WITH PLEATED SUPPORT

CROSS-REFERENCES TO RELATED APPLICATIONS

This application claims the benefit of U.S. Provisional Application No. 61/808,946 filed Apr. 5, 2013. This application is hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to filters, and more particularly to filters made for applications where industrial coatings are applied.

Paint and other industrial coatings are commonly applied to products in manufacturing facilities by spraying the products after placing the products in booths or stations that are separated from the rest of the manufacturing facility. Paint (which is a term used herein to include all industrial coatings) spraying creates "overspray" of atomized particles that do not adhere to the product's surface. Such particles are of various sizes, and can remain wet for some time. Therefore, paint arrestors are used to filter the air inside the paint booth prior to exhausting the air to the environment outside the paint booth to remove wet and dry overspray particles.

Air filtration devices used in booths where painting by spraying is carried out are well known, such as in U.S. Pat. Nos. 3,075,337; 4,008,060; 4,894,073; 5,051,118; and 6,790,397. In these patents, which are incorporated herein by reference, methods and apparatuses are disclosed describing how to take the dry and/or wet particles in suspension out of a gaseous flow, generally air.

To purify such gaseous flows an "inertia" filter can be used. An inertia filter causes turbulence in the flow of gas that contains the paint particles, thereby projecting the suspended particles against the walls of the filters due to the particles' inability to flow around the walls of the filters as well as air. These filters are known in the industry to be sold by Andreae Team, Inc. of Ardmore, Okla. In inertia filters, the filters are of the pleated or accordion type and have two or three walls made of air-impervious material, generally paperboard. These walls are connected along one or two folds and have different dimensions so that chambers are created between the walls. These walls have openings that are not aligned with each other along the direction of air flow. Thus, a turbulent flow of the gas is created within the chambers of the filter. This turbulent flow causes projection of the paint particles, by the inertia of the particles, against the walls of the chambers where they are deposited. Inertia filters ensure a constant pressure drop over their lifetime but have the drawback that they do not retain small, light particles, the mass of which is insufficient for inertia to project them against the walls for deposition. For certain types of paint, particularly lacquers, these filters have an efficiency that cannot satisfy the more strict environmental standards.

Alternatively, filtration can be accomplished by screening/sieving, i.e. by passage of the gas and entrained particles through a porous media with tortuous paths causing impact of the particles with the media, and causing particles to be held when the particles encounter a tortuous path smaller than the particle. These filters typically do not retain dry particles having a size smaller than their pores. Thus, screening filters commonly have a low efficiency. It is possible to make such filters with smaller pores to increase efficiency, but this introduces a substantial pressure drop across the media. Loading with particulate causes such screening filters to clog rapidly, thereby causing an increasing pressure drop, necessitating frequent replacement.

The filters now in use in this field have to be changed often, because government environmental standards generally require arrestance efficiencies greater than or equal to 98%, and filters that are able to meet these efficiency standards tend to require more frequent replacement due to filling with overspray more quickly. These filters are made by removable elements intended to be mounted in adapted frames, such as channels into which planar filter cartridges are inserted. The air flow is driven perpendicularly through the filter cartridges as in a residential heating, cooling and ventilation filtration system.

There is a need for an improved filter that has low pressure drop and high paint retention efficiencies, and that does not have to be replaced at a rate that either slows work substantially or causes the cost of use to be too high.

BRIEF SUMMARY OF THE INVENTION

The invention is a filter for industrial coating application filtration systems. The filter has a housing made up of a peripheral wall, which extends around the entire periphery of the filter. The housing is preferably made of paperboard, corrugated paper, plastic or any other suitable material that remains rigid enough to retain its shape under the circumstances in an industrial coating application filtration system.

A support structure backing is preferably placed within the housing to support a filtration media, discussed below, and the backing is preferably made of corrugated paperboard, although any suitable material will suffice. The support backing has a planar configuration with large openings formed through it so that air can flow therethrough without substantial resistance. The preferably planar sheet of which the support backing is made is bent along hinges to form a pleated configuration. In the pleated configuration, the support backing defines a series of panels, each of which is angled to next adjacent panels forming a plurality of generally V-shaped waves.

Prior to bending the support into the pleated configuration shown above, it is preferred that filter media be attached onto the support. In a preferred embodiment, the media is slit and expanded paper, and is more preferably multiple layers of slit and expanded paper disposed in a stacked configuration. Furthermore, it is contemplated to add a polymer filter media as a layer that air passes through last when traversing the media during normal operation in order to most effectively remove any matter that is desirably removed from the air.

The combination of the filter media attached to the support backing is mounted to substantially planar end caps with slots through which tabs on the opposite ends of the support backing insert. The combination is then slid into the housing with a bottom end cap parallel to and adjacent the bottom of the housing and a top end cap parallel to the final (closed) position of the top of the housing. The flaps of the housing are similar to those on paperboard boxes and are manually or automatically closed, as described below. This preferably causes some or all of the tabs to bend over, thereby forming an angle of about ninety degrees with the attached panels of the support backing from which the tabs extend. Thus, when the lid flaps are fastened over the bent tabs, it is essentially impossible for the tabs to be pulled out of the top and bottom caps. Upon closing, the flaps are sealed in the closed position by any suitable fastener, such as tape.

The invention described and shown herein creates an extended surface area filter structure that preferably fits in a conventional modular wall frame that is known for use in industrial coating applications. The wall frame can be a metal frame that is used with paint booth filter apparatuses, or a similar structure to hold filters using various structural features. This product is structurally different from the prior art and lower in cost.

The invention is preferably sold in a flat and/or unassembled state to be assembled into a final form after being shipped, preferably without significant skill requirements or adhesives, other than tape. Most preferably the filter allows the use of various filter media types without changing the basic supporting structure, thereby providing an extremely useful, highly variable filter structure.

Figure 1:
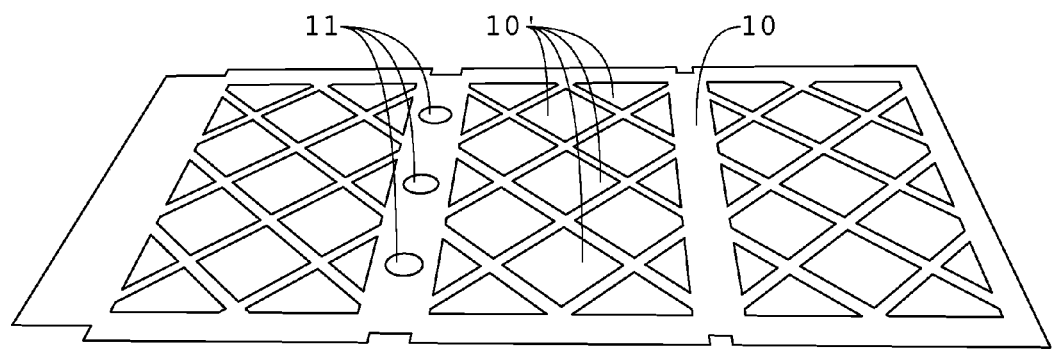
FIG. 1 is a view in perspective illustrating a preferred support backing.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 61/808,946 filed Apr. 5, 2013 is incorporated in this application by reference.

A support structure backing 10 is shown in FIG. 1, and is preferably made of rigid corrugated paperboard sheet with an initially planar configuration. The support backing 10 can be made of any suitable materials including, but not limited to, paper, wood, metal, plastic, or composite. Openings 10' are formed through the support backing 10 so that air can flow therethrough without substantial resistance. The openings 10' can have a rectangular shape that is about two inches by two inches. Of course the openings can be formed of different shapes, and they can be larger or smaller that those shown and described as long as the openings provide substantially no resistance to the flow of air through them. Substantially no resistance to the flow of air is defined herein as pressure drop quantities that do not normally register as measurable using standardized pressure drop test air volumes.

Figure 6:
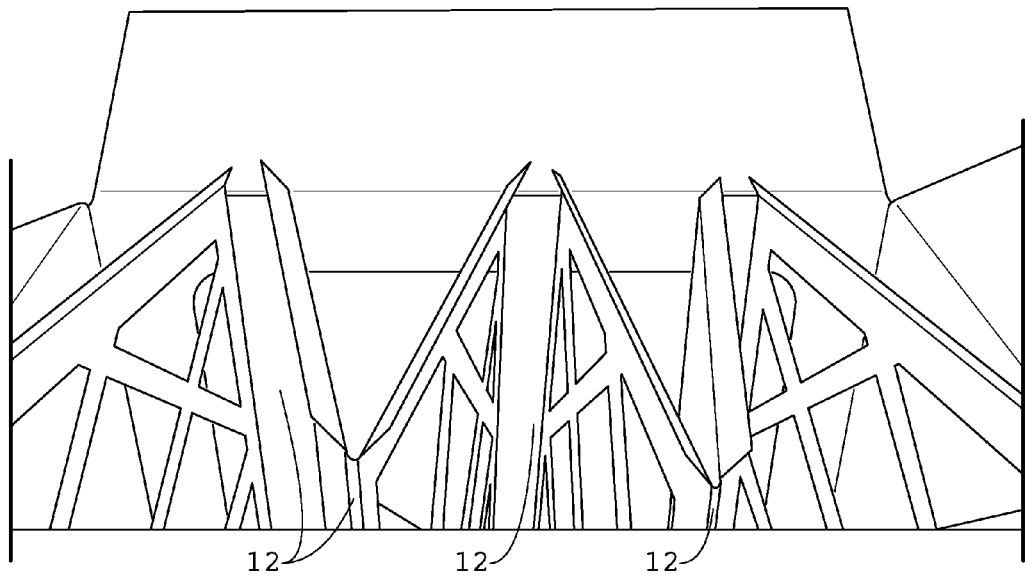
FIG. 6 is a view in perspective illustrating the opening of the housing of FIG. 4 with the support backing of FIG. 3 with no end cap.
Figure 7:
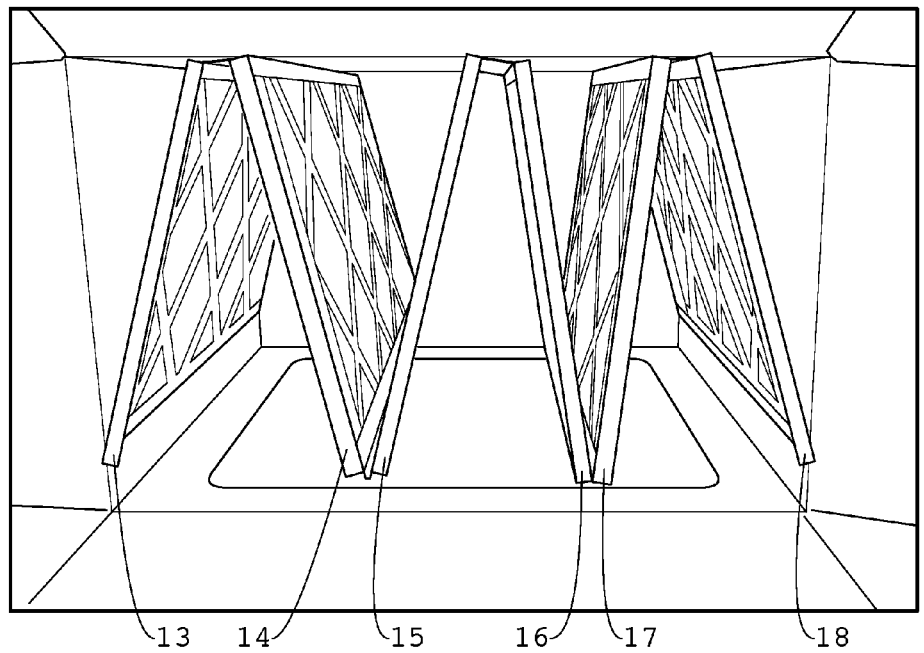
FIG. 7 is a top view illustrating a housing with a support backing mounted therein.

The preferably planar sheet of the support backing 10 is bent along hinges 12 (see FIG. 6) to form a pleated configuration. The hinges 12 are preferably formed by perforating or otherwise weakening the material along straight lines, and bending the support backing 10 to fold along the lines to form hinges 12. In the pleated configuration, the support backing 10 defines a series of panels (see FIG. 7) 13, 14, 15, 16, 17 and 18, and each of the panels adjoins with and is angled to a next adjacent panel, thereby forming a plurality of generally V-shaped angled panels.

Prior to bending the support into the pleated configuration discussed above, it is preferred that filter media 20 (see FIGS. 14 and 15) be attached onto the support backing 10. In a preferred embodiment, the filter media 20 is slit and expanded paper, and is more preferably multiple layers of slit and expanded paper disposed in a stacked configuration, which can be attached to one another by adhesive, stitching or other fasteners. Filter media 20 is not shown in FIGS. 1-13 attached to the support backing 10, although there would preferably be filter media 20 mounted to the support backing 10 when it is in the configuration shown, because omitting the filter media 20 allows the best illustration of the support backing 10 before and after installing in the housing (as described below).

Figure 2:
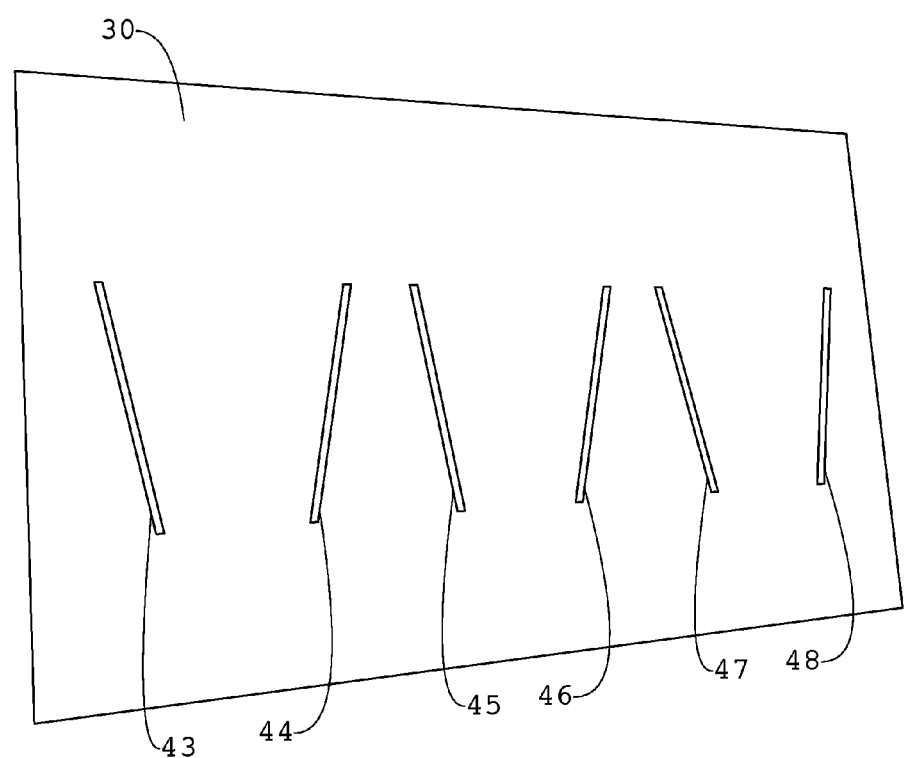
FIG. 2 is a top view illustrating a preferred end cap.
Figure 3:
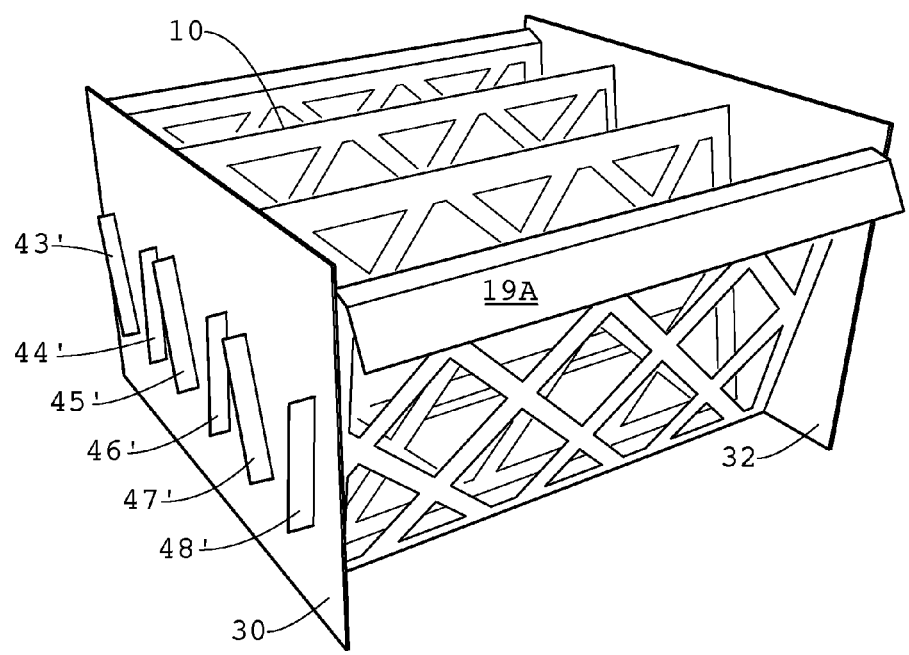
FIG. 3 is a view in perspective illustrating a preferred support backing mounted to preferred end caps.
Figure 4:
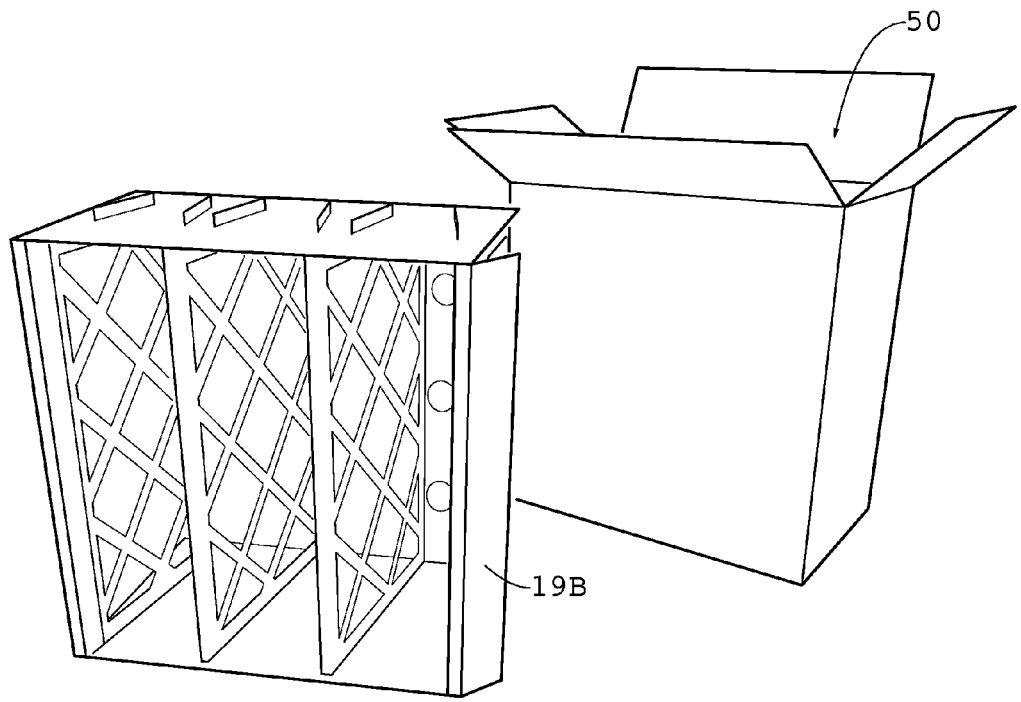
FIG. 4 is a view in perspective illustrating the support backing of FIG. 3 and a preferred housing.
Figure 5:
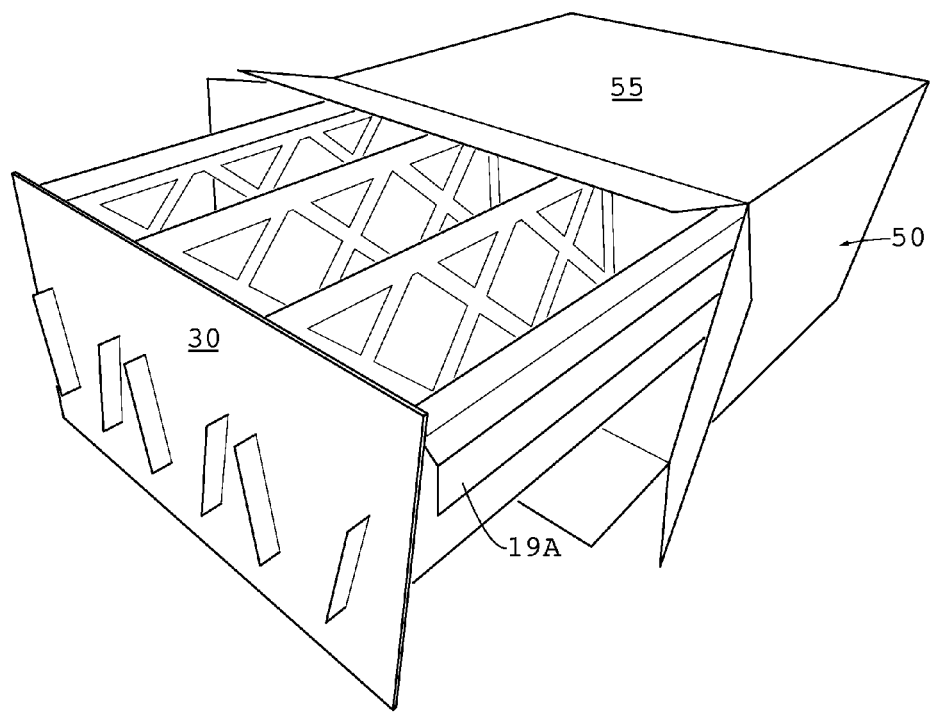
FIG. 5 is a view in perspective illustrating the support backing of FIG. 4 inserted into the housing of FIG. 4.
Figure 25:
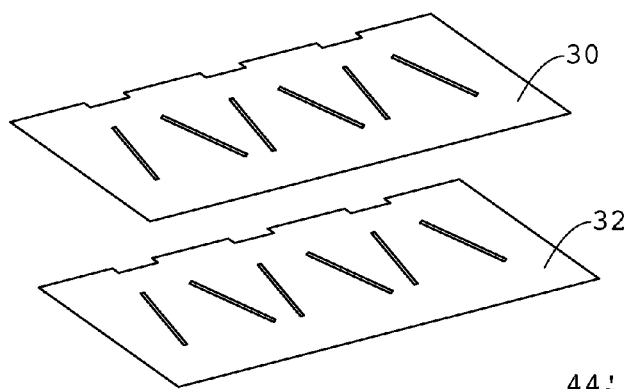
FIG. 25 is a view in perspective of the preferred end caps.
Figure 26:
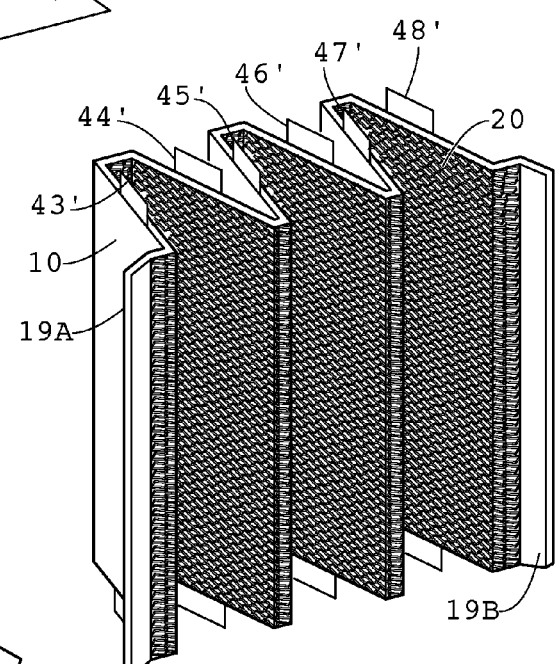
FIG. 26 is a view in perspective illustrating of the preferred support backing with attached filtration media.

The support backing 10 is bent into a pleated shape as shown in FIGS. 3-7 and 26, and is retained in that configuration by a pair of substantially planar mirror image top and bottom end caps 30 and 32, respectively, shown in detail in FIGS. 2 and 25. Slots 43, 44, 45, 46, 47 and 48 are formed through the cap 30 at the same angles to which the support backing 10 is bent in its final configuration (when looking at the end of the support backing 10 along the axis of each panel 13-18, see FIG. 7). The slots are aligned to be parallel to the ends of the pleated panels, as shown in FIGS. 3-5 and 26, when the panels are in the pleated orientation. Each of the slots in the end cap 30 accepts a corresponding one of the tongue-like tabs 43', 44', 45', 46', 47' and 48' extending from one end of the support backing 10, and each of the slots in the end cap 32 receives a corresponding one of the tongue-like tabs (see FIG. 26) extending from the opposite end of the support backing 20. The tabs extend through the respective slots to retain the support in the pleated configuration. The end caps 30 and 32 hold the tabs, and therefore the support panels, at the angled relationships desired as shown in FIGS. 3, 4 and 26.

Figure 27:
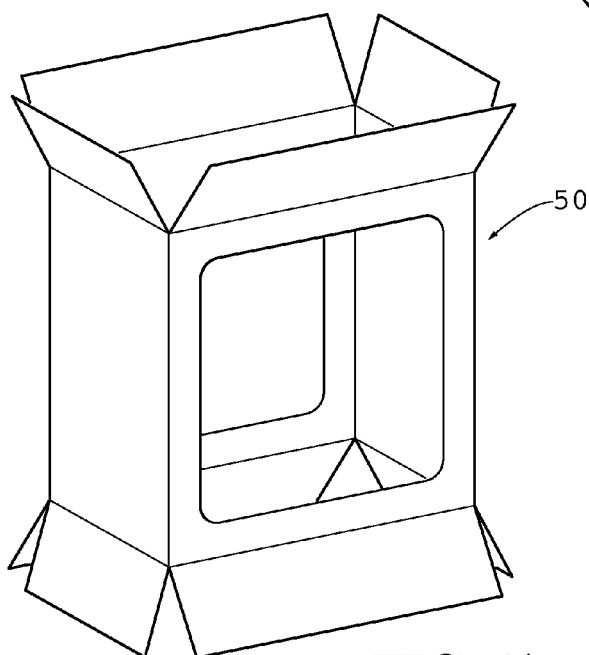
FIG. 27 is a view in perspective illustrating the preferred housing showing end flaps on opposing ends thereof.

The assembly is next installed in a housing 50, which is preferably a paperboard box, as shown in FIGS. 4 and 27. The housing 50 is preferably made of corrugated paperboard, but can be made of any suitable material including, but not limited to, paper, wood, metal, fabric, plastic, and composite. The housing 50 is contemplated to be about 20 inches wide by about 20 inches tall by about 12 inches deep, which is a size that will fit in a conventional opening in a typical paint filtering frame, thereby permitting the filter to be installed, used, and then removed from the frame for disposal after its useful life has been reached. Of course, as will become apparent from the description herein, the size of the housing 50 is not critical, and can be varied substantially from the measurements given above as examples. For instance, the housing 50 can be more than 12 inches deep, such as 19.5 inches deep, or it can be even deeper, and it will become apparent that the housing 50 will be advantageously sized to fit the prospective paint filtering system frame opening. The housing 50 preferably has perforated, scored or other partial cuts formed through the box's opposing front and rear major faces 52 and 54 that can form openings through which air passes during use once the panels 53 and 55 defined by the portion of material within such cuts are removed as shown partially in FIG. 11 and completely in FIG. 12.

Figure 8:
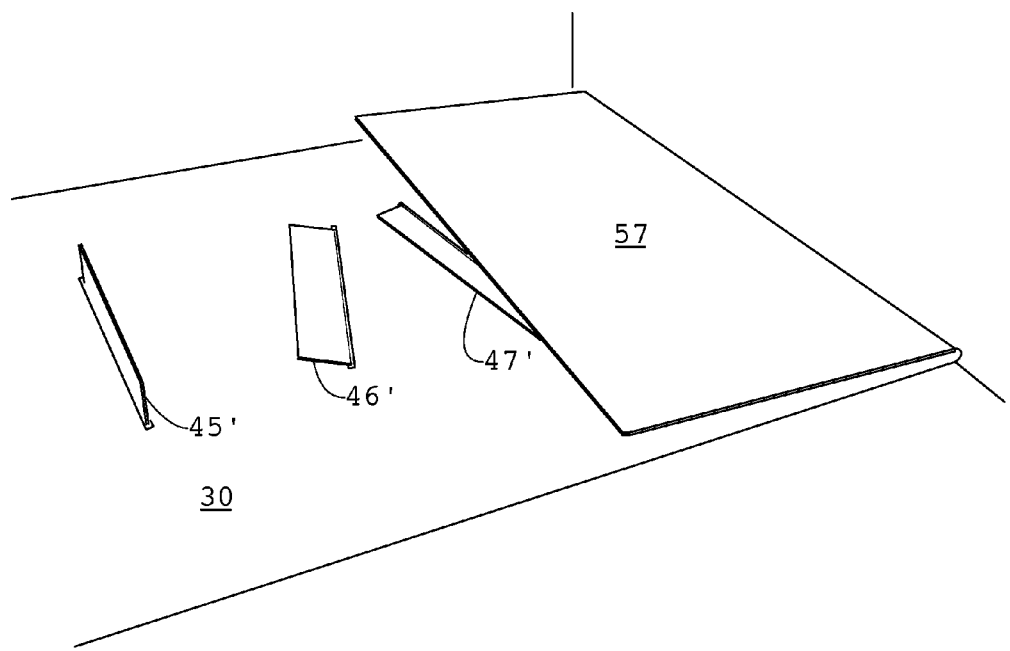
FIG. 8 is a view in perspective illustrating the housing with the end cap and tabs bent after folding of the housing flaps.
Figure 9:
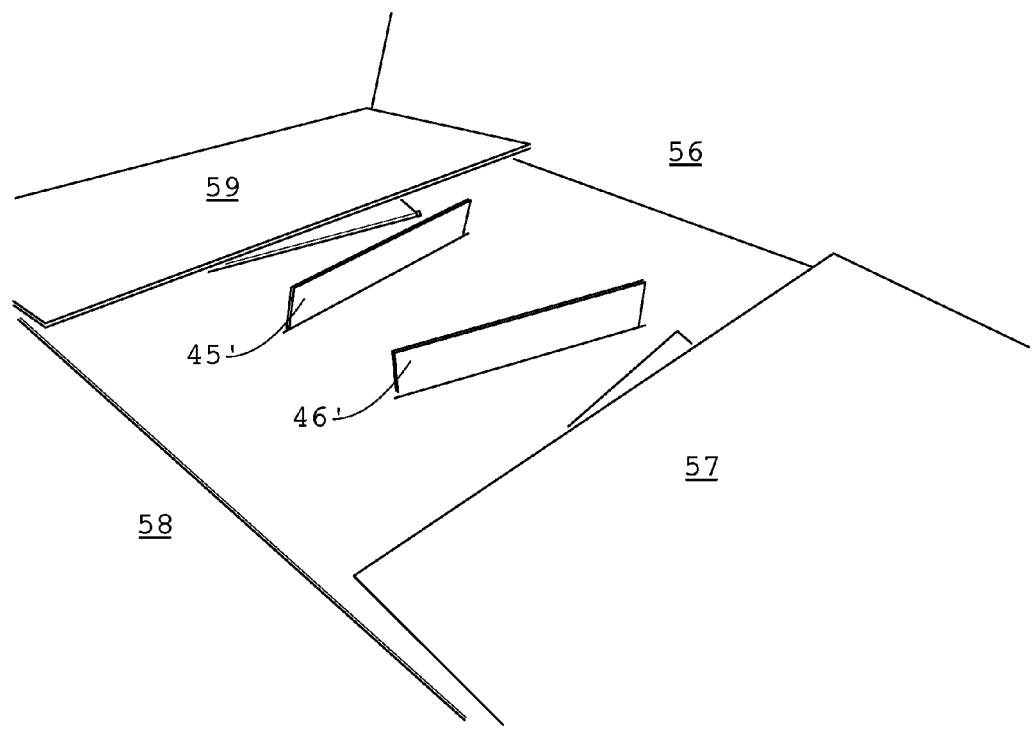
FIG. 9 is a view in perspective illustrating the housing with tabs bent after folding of the housing flaps.
Figure 10:
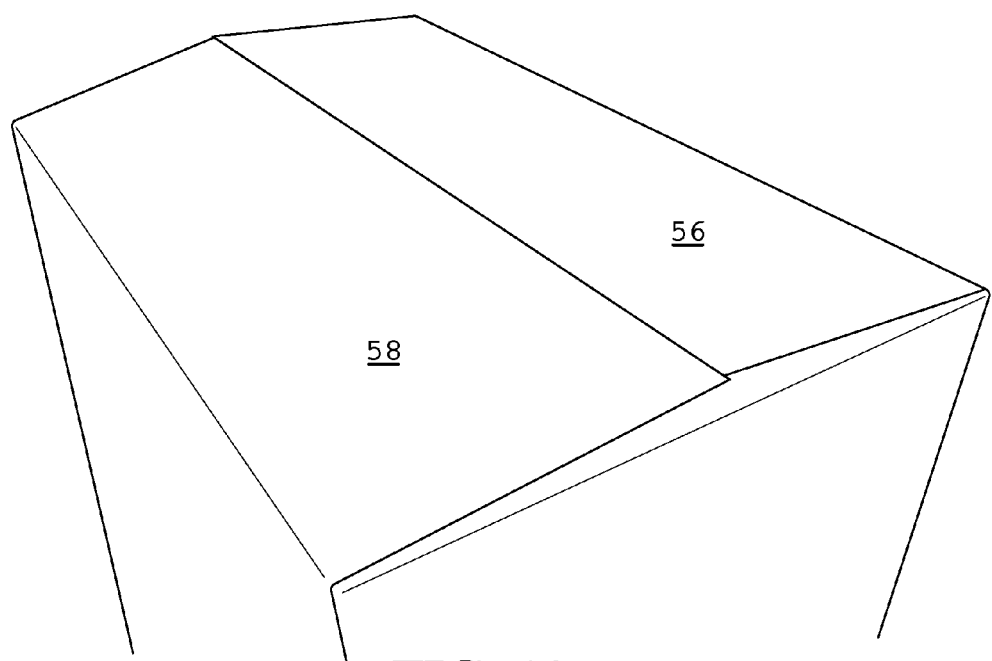
FIG. 10 is a view in perspective illustrating the housing with flaps folded.
Figure 28:
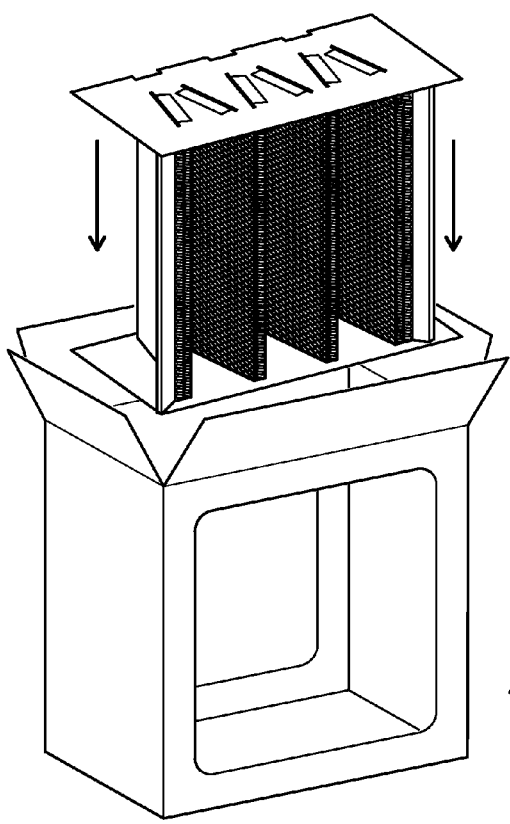
FIG. 28 is a view in perspective illustrating the combination support backing and filtration media being inserted into the housing.
Figure 29:
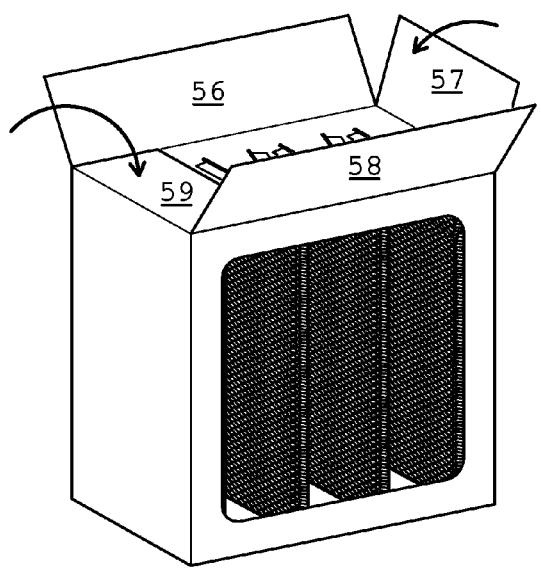
FIG. 29 is a view in perspective illustrating the top flaps being folded over after the step illustrated in FIG. 28.
Figure 30:
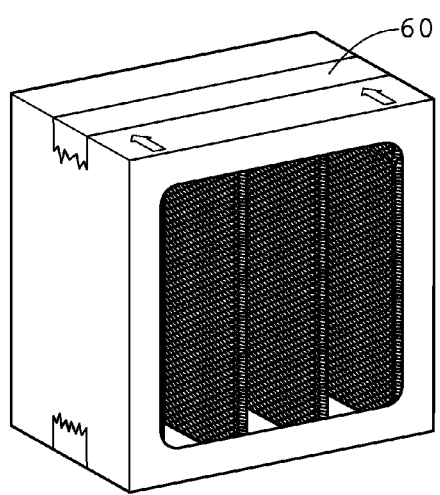
FIG. 30 is a view in perspective illustrating the taping of the flaps of the housing shown in FIG. 27.

The installation of the combination of the filter media 20 and the attached support backing 10 into the housing 50 is carried out by sliding the combination into the housing 50 with the bottom cap 32 parallel to and ultimately adjacent the bottom of the housing 50 and the top cap 30 parallel to the final (closed) position of the top of the housing 50, as shown in FIG. 28. There are preferably flaps 56, 57, 58 and 59 on the top of the housing 50 (and similar flaps on the bottom) that are similar to conventional flaps for corrugated paperboard boxes, and these are manually or automatically closed in a similar manner. As shown in FIGS. 8, 9 and 29, the flaps 56-59 preferably cause the tabs extending through the slots in the end caps 30 and 32 to bend over to be parallel to the end caps 30 and 32, thereby forming an angle of about ninety degrees with the corresponding panels of the support backing 10 from which the tabs extend. Thus, when the housing flap 57 is fastened over the bent tab 47' as the flap 57 is folded to an orientation parallel to the end caps 30 and 32, and then the remaining flaps are folded over, it is essentially impossible for the tabs to be pulled out of the top and bottom caps 30 and 32 during normal use without tearing the tabs. Furthermore, the flaps 56-59 are preferably attached in the closed position shown in FIG. 10 by a suitable fastener, such as tape 60 (see FIGS. 16 and 30) or adhesive. It should be noted that the end caps 30 and 32 can be omitted if the support backing 10 is attached, such as by using adhesives or double-sided tape, to the flaps of the housing 50.

As noted above, the filter media 20 is attached to the support, as shown in FIGS. 26 and 28-30, but is not shown this way in many other illustrations in order for the apparatus to be more readily shown. Multiple layers of slit and expanded paper are currently used as a filter media 20 for paint filtering products, and all such slit and expanded paper media is contemplated. The layers of filter paper can differ from the front to the back of the filter, such as by the sizes of the holes in the paper, the solid material between the holes, the shapes of the holes and/or the positions of the holes relative to the solid portions. This can thereby allow one to create a filter of ever decreasing hole size, offset holes, etc. to maximize paint retention and depth loading for high holding capacity. In one contemplated embodiment, a layer of slit and expanded paper placed in the most upstream position has the largest holes, the next downstream layer has smaller holes, and so forth to the back of the housing where air exits at the downstream end.

It is contemplated to add a polymer filter media layer as a layer that air passes through last when traversing the filter media 20 during normal operation in order to most effectively remove any matter that is desirably removed from the air. Indeed, one of the many advantages of the invention is that, due to the manner by which filtration media is mounted to the support backing, not only can virtually any filtration media known be used, but significant variations in the types of filtration media will not cause substantial variations in the operation of the filter that would require modifications to the rest of the filter. Thus, from one filter to another, the filtration media can be modified based on the use, and the only modification required to the filter is the filtration media. Neither the support backing, nor the housing, nor the end caps need to be modified based on a change in the filtration media. This provides significant flexibility in use.

Figure 13:
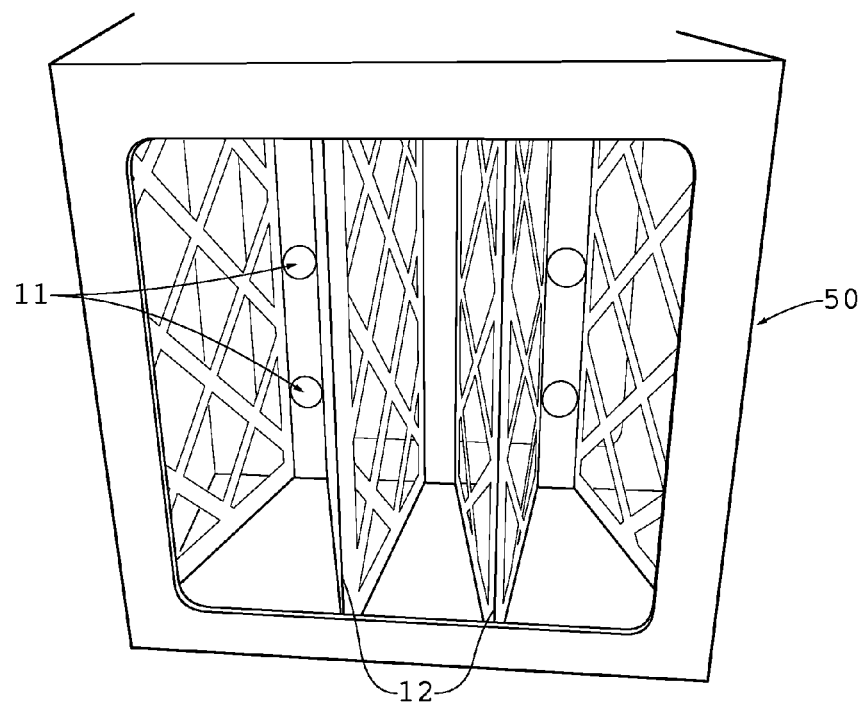
FIG. 13 is an inlet side view illustrating the present invention with both portions removed to open the housing's inlet and outlet sides.
Figure 14:
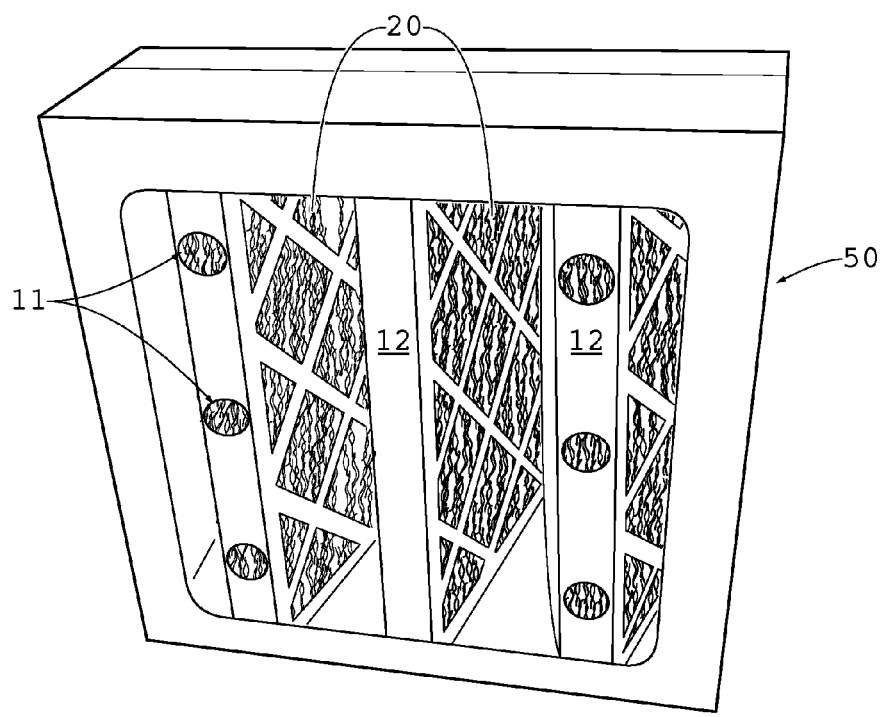
FIG. 14 is a view in perspective illustrating the present invention in operable configuration.

As shown in FIG. 13 (showing the air inlet side) and FIG. 14 (showing the air exit side), the hinges 12 at the exit side of the housing 50 are preferably wider than the hinges 12 on the inlet side where a sharper, typically V-shaped bend is formed. The wider exit hinges 12 thereby have a larger space between the furthest extremes of next adjacent panels so that the filter media 20 can be tucked into the wide exit hinges 12. Because the exit hinges 12 in the support backing 10 are wider, there is room for the thicker (preferably about one-half inch thick) filter media 20, which is bent at the hinge, to fit therein. This prevents either severe compression of the media or shortening of the depth of the panels that would occur with single bends forming a V-shaped hinge. Apertures 11 are also formed in at least some of the wider exit hinges 12 to permit air to flow without substantial resistance through the backing support 10 in these regions. As shown in FIG. 14, large apertures 11 can be formed in the wide exit hinges 12 between adjacent panels in order to allow airflow through the exit hinges 12. The filter media 20 covers these apertures on the upstream side, as shown in the view of FIG. 14, and receives paint during ordinary use.

Figure 11:
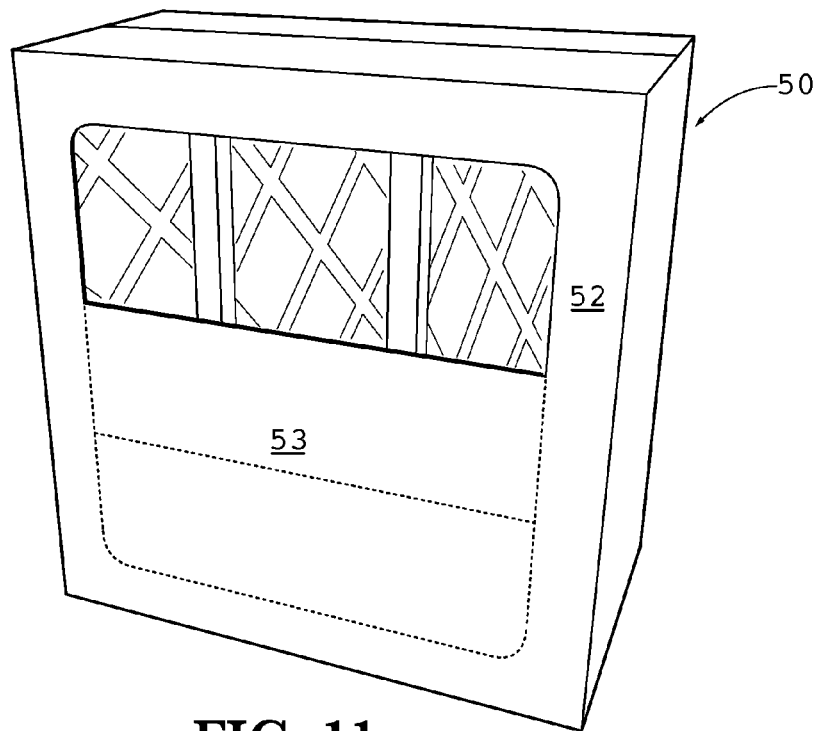
FIG. 11 is a view in perspective illustrating the preferred embodiment with one of the portions partially removed from the housing.
Figure 12:
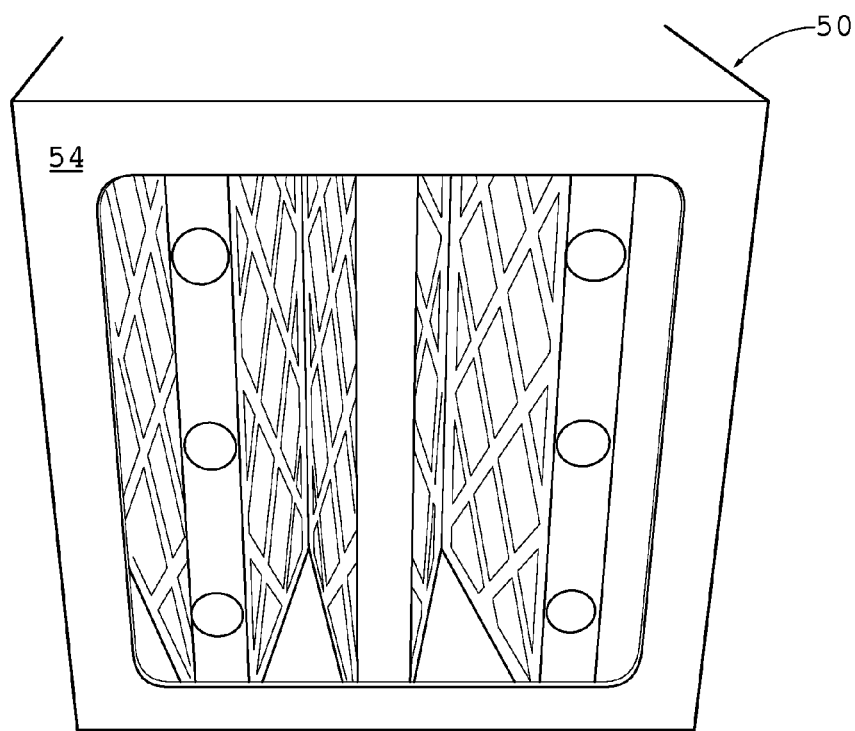
FIG. 12 is an outlet side view illustrating the present invention with both portions removed to open the housing's inlet and outlet sides. The support backing is shown with the filtration media removed for illustrative purposes.

As shown in FIG. 11 with paperboard portion 53 partially removed, the openings are partially formed in the major faces of the housing 50 to expose the internal assembly to a flow of air therethrough. The FIG. 14 structure, with both paperboard portions removed, can be placed in a filter apparatus so that air that contains paint particles and other material can be forced through the filter. The paint and other particles impact the filter media 20 and adhere to the filter media 20 rather than passing through the filter. In a preferred embodiment, the paperboard portions that are removed to form openings can remain in place until just before use so that the entire product can be shipped without having to be packaged in a separate container. That is, the outer box housing 50 serves as a "shipping container" for the product. Upon arrival at the end user's location, the portions within the perforated lines are removed by hand to form the openings, and the product is put into use.

In a contemplated embodiment, the support backing 10 with filtration media 20 attached thereto is in a collapsed configuration, such as by being compressed from both ends, when in the configuration shown in FIG. 26. This reduces the volume such a structure occupies. Furthermore, the housing 50 is also collapsed, such as by being compressed into a substantially flat state (not illustrated), by folding the flaps open and folding along two opposite corners. Further folding can be carried out as well. Finally, the end caps are placed substantially parallel to the collapsed housing 50 and the collapsed support backing 10, thereby occupying a small volume, and also packaged, such as in transparent polymer film, a paper bag or a thin box. The embodiment in this configuration can be shipped without occupying as much volume as when it is in its useable configuration. Thus, the recipient of the package can remove the components and assemble the filter by expanding the housing and support backing 10, inserting the tabs in the respective slots of the end caps 30 and 32, installing the assembly in the housing, and then taping the flaps shut.

As can be seen in FIGS. 3-5 and 26, there are wings 19*a* and 19*b* formed at opposite extreme ends of the pleated panels. Filter media 20 extends over the wings 19*a* and 19*b*, and thread is stitched through the wings 19*a* and 19*b* to hold the filter media 20 to the backing support 10. The wings 19*a* and 19*b* seat against the opposing inner surfaces of the housing when the assembly is installed therein, and form a seal against the inner surfaces. It is preferred that no adhesive or other fastener is used to bond the filter media 20 attached to the wings 19*a* and 19*b* to the internal surfaces of the housing. Instead, the wings 19*a* and 19*b* are configured so that the force of the air through the housing 50 tends to seat the wings strongly against the internal surfaces of the housing to prevent air bypassing the filter media 20. When high velocity air is blown through the openings of the housing 50, the wings 19*a* and 19*b* are forced, by virtue of the air's direction and the angled surface of the adjacent panel, against the inwardly facing surface of the adjacent side of the housing 50. This causes the filter media 20 to be compressed between each wing and adjacent sidewall of the housing 50, thereby preventing any air bypass that might escape a tortuous path through the filter media 20.

Figure 15:
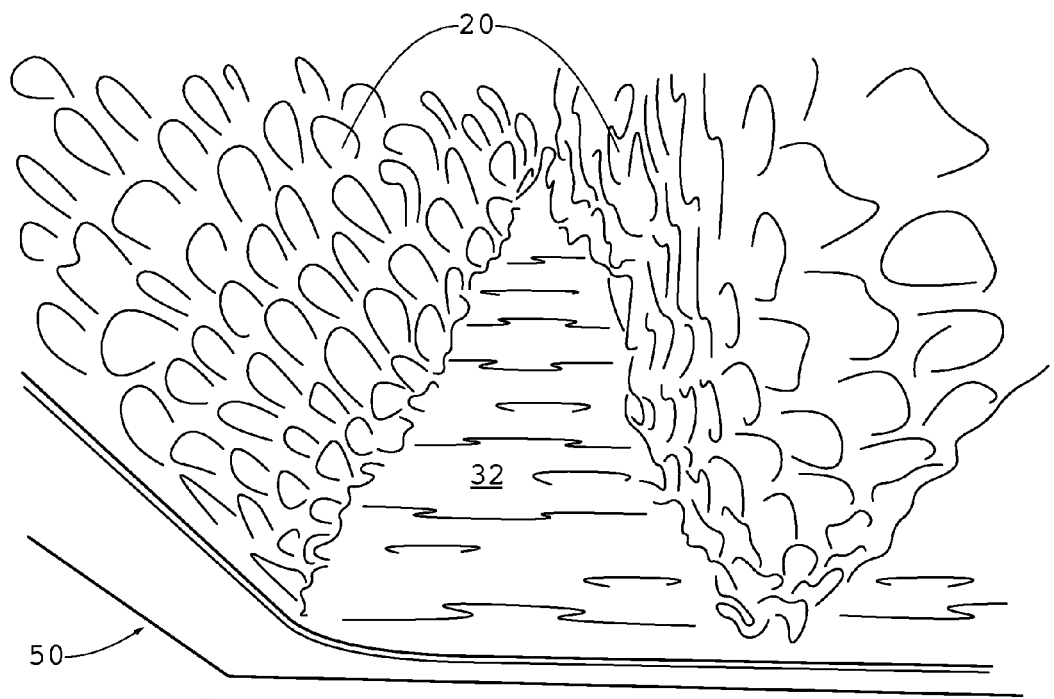
FIG. 15 is a magnified view in perspective illustrating the present invention after use.
Figure 16:
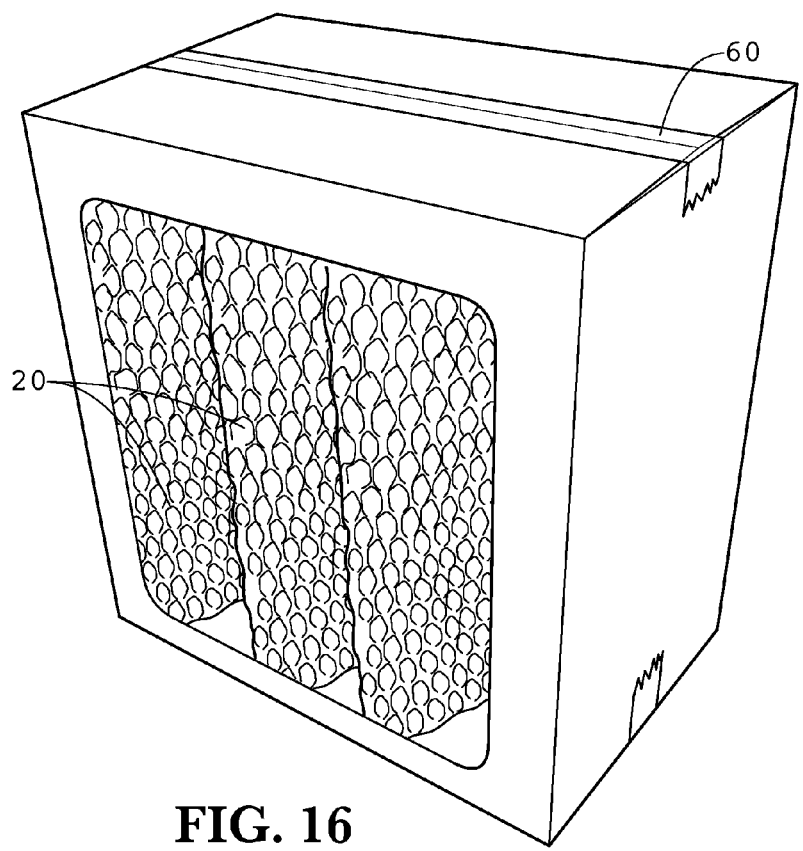
FIG. 16 is a view in perspective illustrating the present invention after use.
Figure 17:
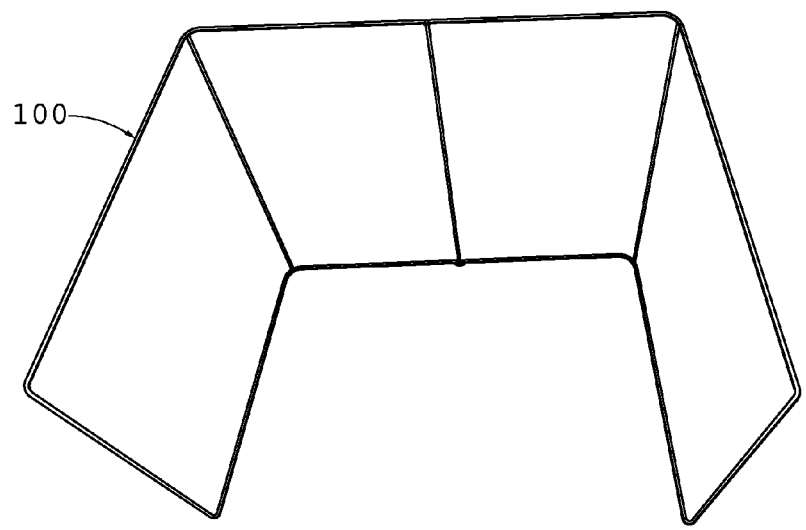
FIG. 17 is a view in perspective illustrating a rigid frame of an alternative embodiment.
Figure 18:
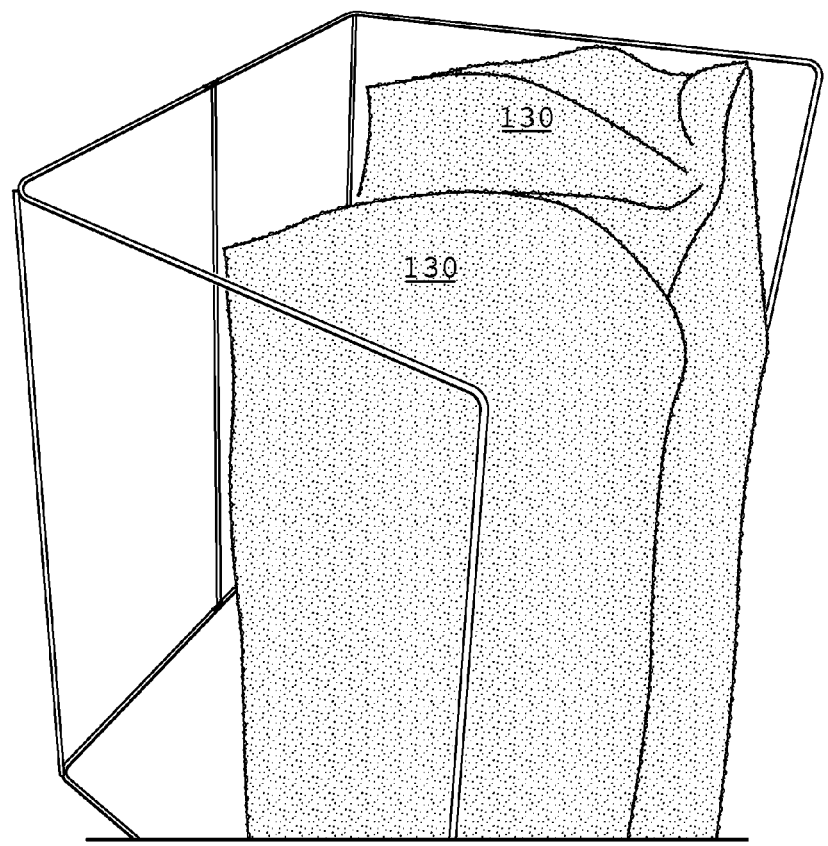
FIG. 18 is a view in perspective illustrating the rigid frame of FIG. 17 with a conventional bag filter arrangement.
Figure 19:
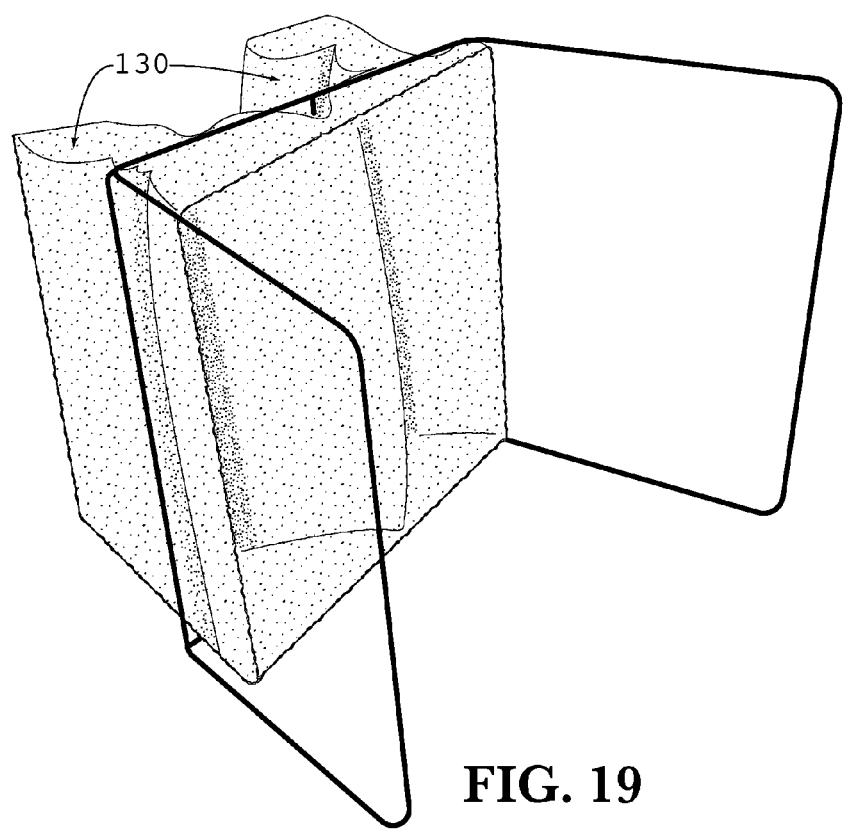
FIG. 19 is a view in perspective illustrating the frame and bag filter in an operable orientation.
Figure 20:
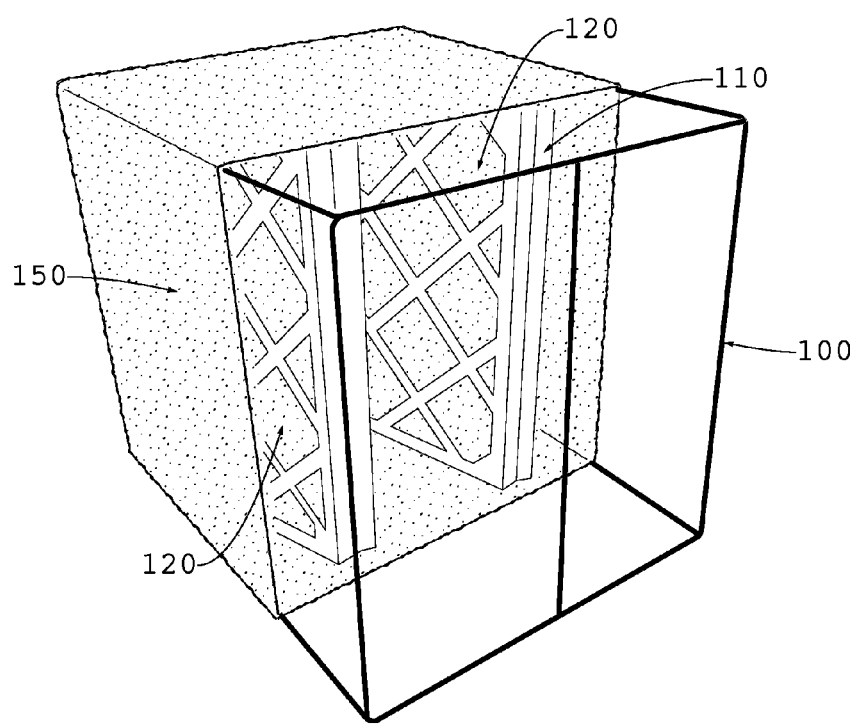
FIG. 20 is a view in perspective illustrating a housing with support backing and filtration media disposed therein and the frame inserted partially between the housing and the support backing.
Figure 21:
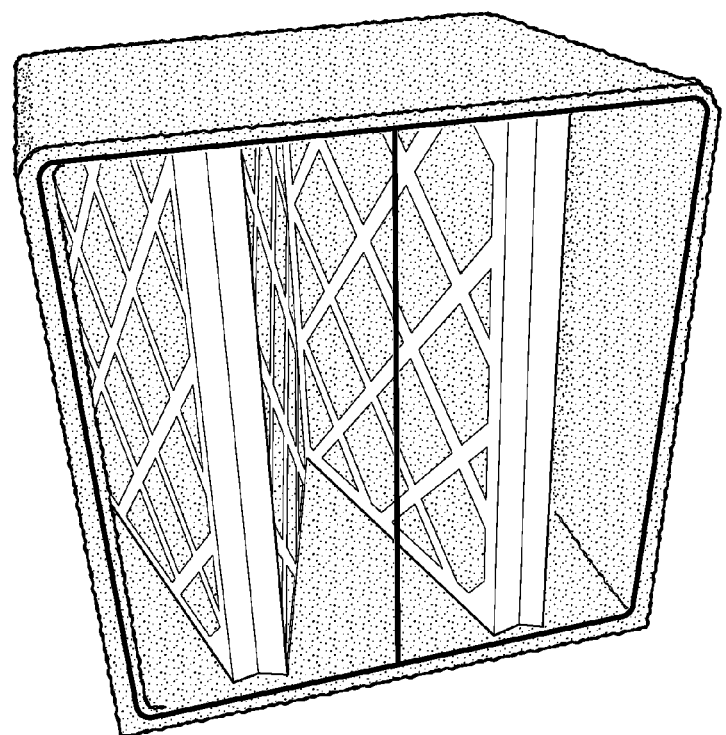
FIG. 21 is a view in perspective illustrating the outlet side of the embodiment of FIG. 20.
Figure 22:
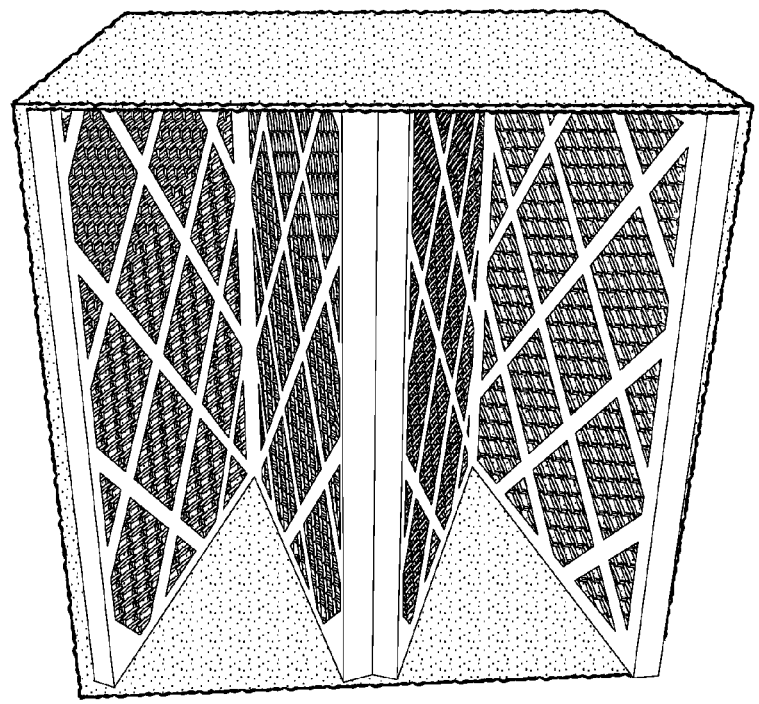
FIG. 22 is a view in perspective illustrating the inlet side of the embodiment of FIG. 20.

As shown in FIGS. 15 and 16, paint collects on the inlet side of the media and can run down to bottom of the housing 50. The end panel 32 provides extra absorption of paint at the ends, and prevents paint from running out of the filter. As can be seen from the rear view of the filter in FIG. 14, the paint (red in this example), loads the media and does not pass entirely through the filter. Instead, when the filter is sufficiently loaded with matter, it is discarded.

It should be noted that, although the preferred embodiment of the invention has a paperboard support backing, housing and paper filtration media, it is possible to use synthetic filtration media with an otherwise paperboard housing and support backing. It is also contemplated that any conventional material can be used to form the housing and support backing. For example, fiberglass is a known support backing and, in different composition, as a filtration media. Polyester is also a known filtration media, as are needle felt and others. The person of ordinary skill will understand how to incorporate these materials into the invention upon reading the description herein.

An alternative embodiment is contemplated having a substantially synthetic housing and support backing, as shown in FIGS. 17-25. A rigid, preferably metal, frame 100 (FIG. 17) is shown with a synthetic, non-woven fiber covering the frame and forming a housing 150. The frame 100 is preferably collapsible or is assembled from a compact state. The housing 150 can be any material, including without limitation felt, fabric, and TYVEK brand polytetrafluoroethylene, and is also collapsible. The paint collecting filtration support backing 110 and filtration media 120 can be synthetic or paper, as with the embodiment of FIGS. 1-16, and preferably folds or otherwise collapses to a compact state. One or more conventional bag filters 130, which are also collapsible, can be added to the outlet side, but are not required. The filtration media 120 can be attached to the backing support 110 by stitching in a conventional manner around the peripheral edges of the media and the backing support 110 prior to the backing support 110 being formed in the pleated configuration. Alternatively, the media can be attached otherwise, such as by gluing or sonic welding, among other means of attachment. Because the media is attached to the support backing 110, virtually any media can be used, and enormous variation is permitted by the invention as to the types of media used.

Figure 23:
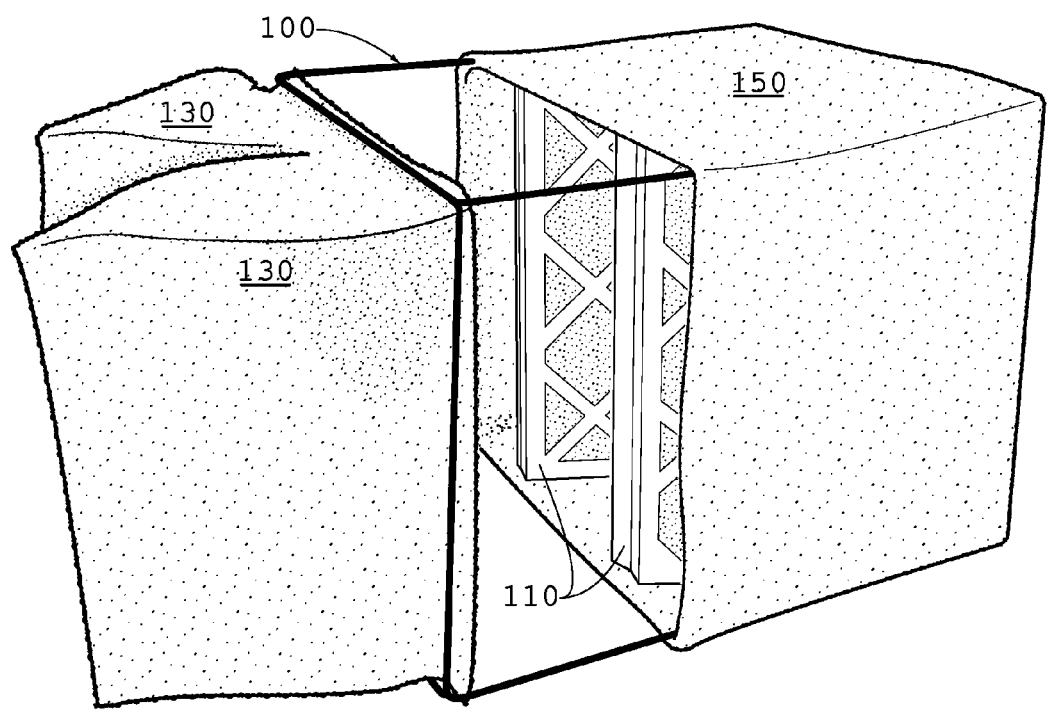
FIG. 23 is a view in perspective illustrating the embodiment of FIG. 20 in a nearly completed stage.
Figure 24:
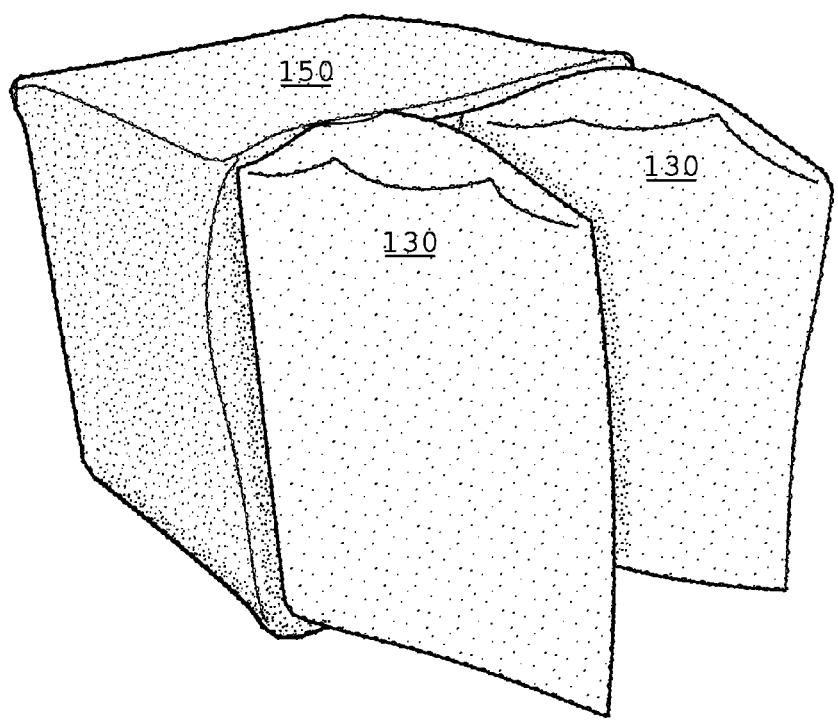
FIG. 24 is a view in perspective illustrating the embodiment of FIGS. 17-23 in a completed stage.

As shown in FIGS. 17-25, the metal frame 100 supports the housing 150, and the bag filters 130, and at least a portion of the frame 100 is inserted between the housing 150 and the backing support 110. Preferably, the bag filters 130 are placed in the metal frame 100 prior to inserting the legs of the metal frame 100 into the housing 150 that contains the backing support 110 and filtration media 120, as shown in FIG. 23. FIG. 24 shows the completed filter from the rear, where the bag filters 130 are positioned over the rear (exit) side of the filter. The FIG. 24 embodiment is advantageous due to various features, including without limitation the lower cost of the components thereof, the fact that it is collapsible to a significant degree, and the smaller volume for disposal, shipping and/or recycling. Furthermore, the metal frame 100 can be reused, or easily recycled.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A filter for a spray coating system, the filter comprising:
    (a) a housing including a peripheral sidewall having an inlet opening on a first side and an outlet opening on a second, opposite side of the housing, the inlet and outlet openings providing substantially no resistance to the flow of air along a flow path extending through the housing from the inlet opening to the outlet opening;
    (b) a support backing disposed within the peripheral sidewall between the inlet and outlet openings, the support backing having at least a first substantially planar panel joined at a first edge to a first edge of a second substantially planar panel at a predetermined, non-parallel angle thereto, said first and second panels having openings formed therethrough to provide substantially no resistance to the flow of air through the panels;
    (c) a filtration material attached to the support backing; and
    (d) first and second end caps mounted within the housing to the support backing at opposite ends of the first and second panels and on opposite sides of the flow path transverse to the first edges of the first and second substantially planar panels, for maintaining said at least first and second substantially planar panels at the predetermined angle.

2. The filter in accordance with claim 1, wherein the filtration material is made of slit and expanded paper.

3. The filter in accordance with claim 2, wherein the slit and expanded paper nearer the inlet opening has openings larger than slit and expanded paper near the outlet opening.

4. The filter in accordance with claim 1, further comprising at least one aperture formed in the first and second panels' first edges, wherein said at least one aperture provides substantially no resistance to airflow therethrough.

5. A filter for a spray coating system, the filter comprising:
    (a) a housing including a peripheral sidewall having an inlet opening on a first side and an outlet opening on a second, opposite side of the housing, the inlet and outlet openings providing substantially no resistance to the flow of air through the housing;
    (b) a plurality of substantially planar panels disposed within the peripheral sidewall between the inlet and outlet openings, the panels being interconnected together with each of the panels mounting in a non-parallel relationship to at least an adjacent one of the panels, each of said panels having openings formed therethrough to provide substantially no resistance to the flow of air;
    (c) a first wing extending from an edge of a first of the panels adjacent, but unattached, to the housing sidewall and pivotably attached to the first panel along a pivot axis that is substantially parallel to the housing sidewall;
    (d) a second wing extending from an edge of a second of the panels adjacent, but unattached, to the housing sidewall and pivotably attached to the second panel along a pivot axis that is substantially parallel to the housing sidewall; and
    (e) a filtration material attached to the panels and the wings and extending across the openings in the panels, wherein the first and second wings are configured so that the force of the flow of air through the housing seats the first and second wings against opposite housing sidewalls.

6. A filter for a spray coating system, the filter comprising:
    (a) a housing including a peripheral sidewall having an inlet opening on a first side and an outlet opening on a second, opposite side of the housing, the inlet and outlet openings providing substantially no resistance to the flow of air through the housing;
    (b) a plurality of substantially planar panels disposed within the peripheral sidewall between the inlet and outlet openings, the panels being interconnected together with each of the panels mounting in a non-parallel relationship to at least an adjacent one of the panels, each of said panels having openings formed therethrough to provide substantially no resistance to the flow of air;
    (c) a filtration material attached to the panels and extending across the openings in the panels;
    (d) a first end cap disposed within the housing, the first end cap having a first slot into which at least a portion of a first end of the first panel inserts and a second slot, disposed at a predetermined angle from the first slot, into which at least a portion of a first end of a tab mounted to the second panel inserts; and
    (e) a second end cap disposed within the housing opposite the first end cap, the second end cap having a first slot into which at least a portion of a second, opposite end of the first panel inserts and a second slot, disposed at the predetermined angle from the first slot, into which at least a portion of a second end of the second panel inserts, wherein the first end cap and second end cap are disposed at opposite ends of the first and second panels for maintaining the first and second panels at the predetermined angle relative to one another.

7. The filter in accordance with claim 1, further comprising
    (a) a first housing wall disposed at an edge of the first and second panels to which the first and second panels are attached; and
    (b) a second housing wall disposed at an edge of the first and second panels opposite the first housing wall and to which the first and second panels are attached for maintaining the first and second panel at a predetermined angle relative to one another.

8. The filter in accordance with claim 1, wherein the housing is flexible fabric and further comprising a rigid frame that extends between the housing and the support backing, the rigid frame having an opening at the outlet opening, and at least one bag filter mounted to frame's opening.

9. A method of making an air filter comprising the steps of:
    (a) expanding a support backing from a compressed state, the support backing having at least a first substantially planar panel joined at a first edge to a first edge of a second substantially planar panel, said first and second panels having openings formed therethrough to provide substantially no resistance to the flow of air through the panels and a filtration material attached to the support backing;

(b) expanding a housing from a compressed state, the housing including a peripheral sidewall having an inlet opening on a first side and an outlet opening on a second, opposite side of the housing, the inlet and outlet openings providing substantially no resistance to the flow of air through the housing;

(c) inserting the support backing into the housing within the peripheral sidewall between the inlet and outlet openings; and (d) attaching a first end cap to a first end of the first and second panels and attaching a second end cap to a second end of the first and second panels that is an opposite end of the first and second panels from the first end for maintaining the first and second panels at a predetermined angle relative to one another.

10. A filter for a spray coating system, the filter comprising:

(a) a housing including a peripheral sidewall having an inlet opening on a first side and an outlet opening on a second, opposite side of the housing, the inlet and outlet openings providing substantially no resistance to the flow of air through the housing;

(b) a plurality of substantially planar panels disposed within the peripheral sidewall between the inlet and outlet openings, the panels being interconnected together with each of the panels mounting in a non-parallel relationship to at least an adjacent one of the panels, each of said panels having openings formed therethrough to provide substantially no resistance to the flow of air;

(c) a filtration material attached to the panels and extending across the openings in the panels;

(d) a first end cap disposed within the housing, the first end cap having a first slot into which at least a portion of a first end of the first panel inserts and a second slot, disposed at a predetermined angle from the first slot, into which at least a portion of a first end of the second panel inserts; and (e) a second end cap disposed within the housing opposite the first end cap, the second end cap having a first slot into which at least a portion of a second end of the first panel inserts and a second slot, disposed at the predetermined angle from the first slot, into which at least a portion of a second end of the second panel inserts, wherein the first end cap and second end cap are disposed at opposite ends of the first and second panels for maintaining the first and second panels at the predetermined angle relative to one another.

* * * * *